(12) United States Patent
Subhedar et al.

(10) Patent No.: US 10,511,517 B2
(45) Date of Patent: Dec. 17, 2019

(54) PATH COMPUTATION IN MULTI-LAYER NETWORKS

(71) Applicant: Ciena Corporation, Hanover, MD (US)

(72) Inventors: Sachin Subhedar, Alpharetta, GA (US); Aung Htay, Alpharetta, GA (US); Jiao Li, Woodstock, GA (US)

(73) Assignee: Ciena Corporation, Hanover, MD (US)

( * ) Notice: Subject to any disclaimer, the term of this patent is extended or adjusted under 35 U.S.C. 154(b) by 268 days.

(21) Appl. No.: 14/951,625

(22) Filed: Nov. 25, 2015

(65) Prior Publication Data

US 2017/0149646 A1    May 25, 2017

(51) Int. Cl.
*H04L 12/751*    (2013.01)

(52) U.S. Cl.
CPC .................................. *H04L 45/02* (2013.01)

(58) Field of Classification Search
None
See application file for complete search history.

(56) References Cited

U.S. PATENT DOCUMENTS

| 2002/0165957 A1* | 11/2002 | Devoe | H04L 43/50 709/224 |
| 2003/0172362 A1* | 9/2003 | Mack-Crane | H04J 3/14 370/254 |
| 2007/0115918 A1* | 5/2007 | Bodin | H04L 41/0823 370/352 |
| 2008/0062891 A1* | 3/2008 | Van der Merwe | H04L 45/04 370/254 |
| 2009/0003214 A1* | 1/2009 | Vaswani | H04L 45/00 370/236 |

(Continued)

OTHER PUBLICATIONS

Xu, Li, et al, "A Declarative Approach to Multi-Layer Path Finding Based on Semantic Network Descriptions", Optical Network Design and Modeling International Conference, Feb. 18-20, 2009, 6 pages.

(Continued)

*Primary Examiner* — Hamza N Algibhah
*Assistant Examiner* — Tony Williams
(74) *Attorney, Agent, or Firm* — Clements Bernard Walker; Christopher L. Bernard; Lawrence A. Baratta, Jr.

(57) ABSTRACT

A system for operating a network. The system includes a processor and memory storing instructions. The instructions, when executed by the processor, cause the processor to generate a network path from a source device to a destination device. The instructions include a path calculation engine (PCE) configured to select, from the network, a first intervening device for connecting the source device and the destination device to form the network path, further select, from the network and as additional candidates to form the network path, a first plurality of candidate devices to be in the network path with the first intervening device, and generate, according to a routing constraint of the network, the network path based on the first intervening device and a preference level of each of the first plurality of candidate devices. The instructions further includes a look-ahead analyzer configured to generate the preference level of each corresponding candidate device of the first plurality of candidate devices, the preference level representing a probability of including a candidate device in the network path.

14 Claims, 7 Drawing Sheets

(56) References Cited

U.S. PATENT DOCUMENTS

| | | | | |
|---|---|---|---|---|
| 2010/0157838 A1* | 6/2010 | Vaswani | ................. | H04L 45/00 370/252 |
| 2010/0278069 A1* | 11/2010 | Sharma | ................... | H04L 45/02 370/254 |
| 2011/0142056 A1* | 6/2011 | Manoj | .................... | H04L 45/00 370/400 |
| 2012/0185229 A1* | 7/2012 | Perrett | .................. | G06N 3/126 703/13 |
| 2013/0202299 A1* | 8/2013 | Prakash | ............. | H04J 14/0257 398/51 |
| 2013/0236169 A1* | 9/2013 | Gaudette | ............ | H04B 10/0793 398/25 |
| 2014/0269260 A1* | 9/2014 | Xue | ........................ | H04L 41/12 370/225 |

OTHER PUBLICATIONS

Blonde, V. D., "A Measure of Similarity between Graph Vertices: Applications to Synonym Extraction and Web Searching", Society for Industrial and Applied Mathematics, vol. 46, No. 4, Oct. 29, 2004, 20 pages.

Sarwar, B., et al., "Item-Based Collaborative Filtering Recommendation Algorithms", WWW10, May 1-5, 2001, 15 pages.

* cited by examiner

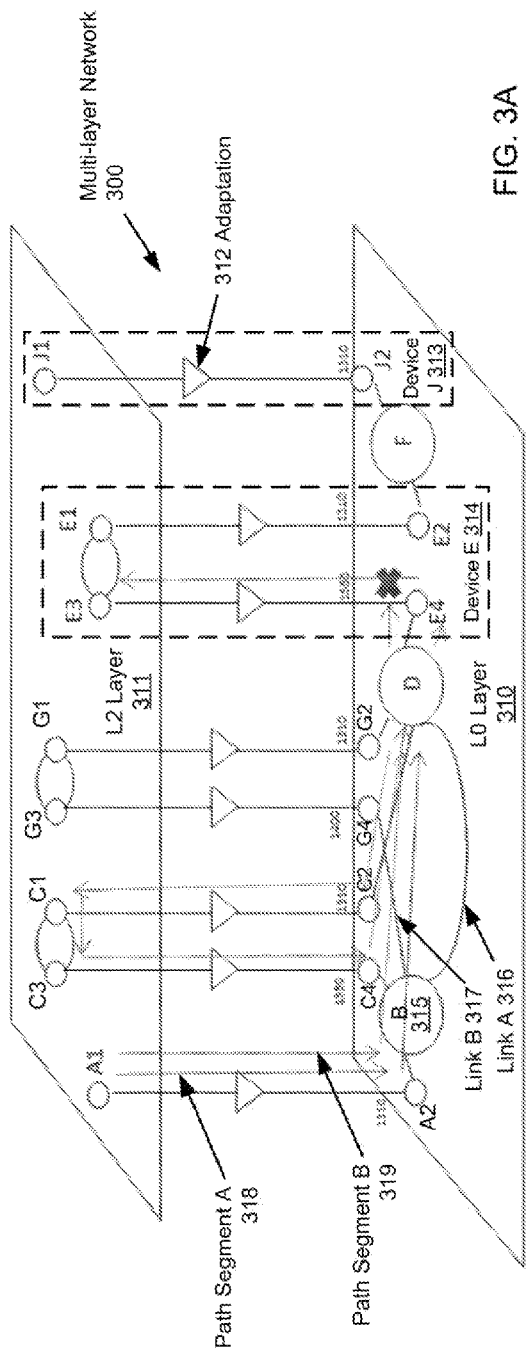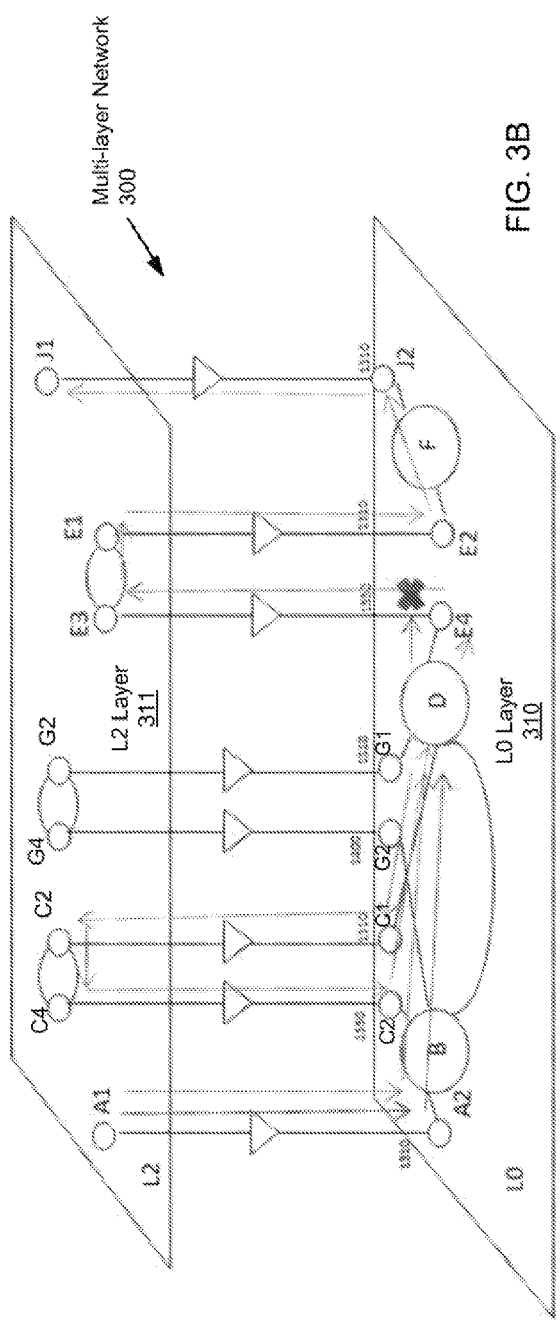

PATH COMPUTATION IN MULTI-LAYER NETWORKS

BACKGROUND

Finding a network path between two nodes in a multi-layer network is a non-trivial problem due to a combination of routing constraints based on attributes across network layers. Moreover, the configuration of the network may be dynamically changed at various network layers. The dynamic changes increase the computation complexity of finding the network path.

When a network path is computed without checking compatibility for different network layers or different implementation technology, the computed network path may not be applicable in the real network. In this case, the result is a false positive after the computation iteration is terminated. Due to the computation complexity, the iteration process may be terminated pre-maturely before a desired network path is found. In this case, the result is a false negative.

SUMMARY

In general, in one aspect, the invention relates to a system for operating a network. The system includes a processor and memory storing instructions. The instructions, when executed by the processor, cause the processor to generate a network path from a source device to a destination device. The instructions include a path calculation engine (PCE) configured to select, from the network, a first intervening device for connecting the source device and the destination device to form the network path, further select, from the network and as additional candidates to form the network path, a first plurality of candidate devices to be in the network path with the first intervening device, and generate, according to a routing constraint of the network, the network path based on the first intervening device and a preference level of each of the first plurality of candidate devices. The instructions further includes a look-ahead analyzer configured to generate the preference level of each corresponding candidate device of the first plurality of candidate devices, the preference level representing a probability of including a candidate device in the network path.

In general, in one aspect, the invention relates to a method for operating a network. The method includes selecting, from the network, a first intervening device for connecting a source device and a destination device to form a network path, further selecting, from the network and as additional candidates to form the network path, a first plurality of candidate devices to be in the network path with the first intervening device, generating a preference level for each candidate device of the first plurality of candidate devices, the preference level representing a probability of including a candidate device in the network path, and generating, according to a routing constraint of the network, the network path based on the first intervening device and the preference level of each of the first plurality of candidate devices.

In general, in one aspect, the invention relates to a non-transitory computer readable medium (CRM) storing instructions for operating a network. The instructions, when executed by a computer processor, include functionality for selecting, from the network, a first intervening device for connecting a source device and a destination device to form a network path, further selecting, from the network and as additional candidates to form the network path, a first plurality of candidate devices to be in the network path with the first intervening device, generating a preference level for each candidate device of the first plurality of candidate devices, the preference level representing a probability of including a candidate device in the network path, and generating, according to a routing constraint of the network, the network path based on the first intervening device and the preference level of each of the first plurality of candidate devices.

Other aspects of the invention will be apparent from the following description and the appended claims.

BRIEF DESCRIPTION OF DRAWINGS

FIGS. 3A, 3B, 3C, 3D, and 3E show an example in accordance with one or more embodiments of the invention.

DETAILED DESCRIPTION

Figure 1A:
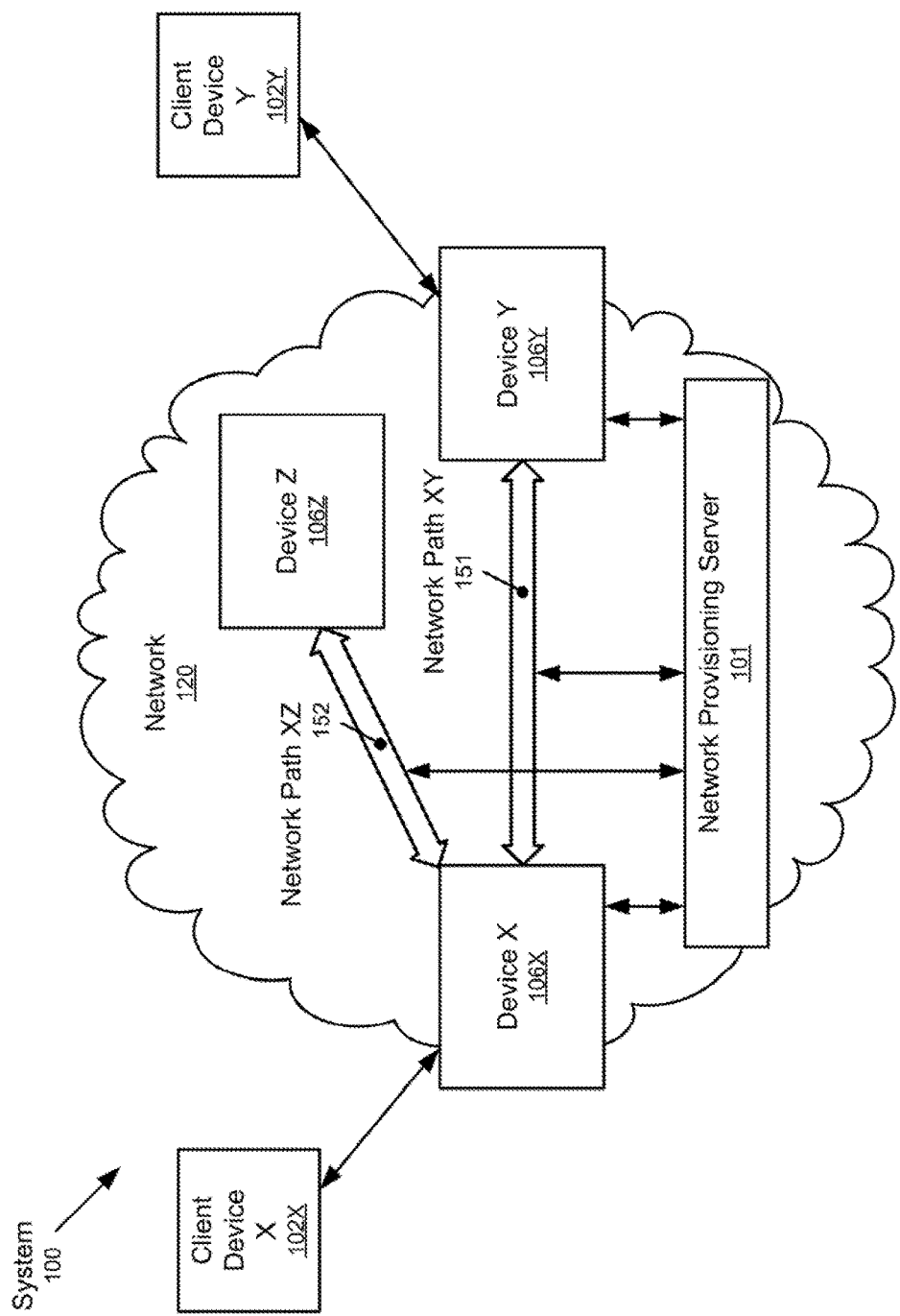
FIGS. 1A and 1B show block diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system, a method, and a computer readable medium for operating a network. In one or more embodiments of the invention, a path computation engine (PCE) generates a network path from a source device to a destination device according to a routing constraint of the network. In one or more embodiments, the PCE computes a hop of the network path by selecting one of a number of candidate devices associated with a previously selected intervening device. For example, each candidate device may be a neighbor of the previously selected intervening device. Specifically, the selection from the candidate devices is based at least on a preference level of each of the candidate devices. In one or more embodiments, a look-ahead analyzer generates the preference level based on a constraint region of the network. In one or more embodiments, the look-ahead analyzer generates the preference level based on previous selections by the PCE during computation of similar network paths. In other words, the look-ahead analyzer provides feedback to the PCE based on topology information of the network and/or historical routing decisions made by the PCE.

FIG. 1A shows a system (100) in accordance with one or more embodiments. In one or more embodiments, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes multiple client devices (e.g., client device X (102X), client device Y (102Y), etc.) connected by a network (120) in accordance with one or more embodiments. In general, the network (120) provides network services to the client devices (e.g., client device X (102X), client device Y (102Y), etc.). In particular, the network services are provided by one or more service providers operating the network (120) to one or more users of the client devices. For example, one or more client devices may be configured to send data over the network (120). Similarly, one or more client devices may be configured to receive data over the network (120). In one or more embodiments, the network services allow the client devices to send/receive data in one or more signal types including Ethernet, digital video, Synchronous Optical Networking (SONET)/Synchronous Digital Hierarchy (SDH), G.709 Optical Transport Network (OTN), and other formats/protocols that are native to the client devices. The client devices may be computing devices of any type including mobile phones, desktop or tablet personal computers (PCs) used by the users, routers, switches or servers operated by the users for accessing the network (120), or other devices operated by the users.

In one or more embodiments of the invention, the network (120) includes wired and/or wireless portions of a telecommunications network. In one or more embodiments, a telecommunications network includes a collection of devices, links, and any intermediate nodes that are connected to enable telecommunication between the devices of the telecommunications network. As shown in FIG. 1A, the device X (106X), device Y (106Y), etc., are nodes of the telecommunication network and may be computing devices or networking devices of any type, including servers, routers, switches, etc., operated by one or more service providers of the network (120). Each device (e.g., device X (106X), device Y (106Y)) may have one or more ports, which are physical and/or logical interfaces for communicating with other devices.

Within the network (120), a network path (e.g., network path XY (151), network path XZ (152)) between two devices is a sequence of links, intermediate nodes, and/or any intervening devices that connect the two devices. A link is a connection between two ports residing on two separate devices (i.e., external link) or within a single device (i.e., internal link).

In one or more embodiments, a device may be connected to multiple network paths. For example, the device X (106X) is connected to the network path XY (151) and the network path XZ (152). In one or more embodiments, multiple network paths may exist between two devices. Accordingly, messages or other telecommunication data may be exchanged between the two devices via one or more of the network paths. In one or more embodiments, the network path XY (151) is used to provide the network services to the client device X (102X) and client device Y (102Y) where the device X (106X) and device Y (106Y) act as the interfaces (i.e., edge network devices) to the network (120). In one or more embodiments, the network (120) includes multiple layers according to a layered network architecture, such as the seven-layer OSI model of computer networking. In such embodiments, the network paths (e.g., network path XY (151)) may include links, intermediate nodes, and/or any intervening devices that support or otherwise are associated with one or more network layers. An example of a multi-layer network is shown in FIG. 3A below.

Further as shown in FIG. 1A, the network (120) includes a network provisioning server (101) in accordance with one or more embodiments. The network provisioning server (101) has many functions including network service provisioning that involves the process of identifying and allocating resources in the network (120) to provide the network services to the client devices. In particular, identifying the resources includes device discovery, routing, and path computation in the network (120). In one or more embodiments, the network provisioning server (101) is configured to create, modify, terminate (i.e., tear down), and restore (i.e., reestablish) connections between the client devices based on network paths in the network (120). For example, the network path XY (151) may be computed or otherwise generated by the network provisioning server (101) to provide a connection through the network (120) for the client device X (102X) and client device Y (102Y). In addition, bandwidth and other resources of the links, intermediate nodes, and/or any intervening devices in the network path XY (151) are allocated by the network provisioning server (101) to the connection according to a service agreement between one or more service providers of the network (120) and the users of the client device X (102X) and client device Y (102Y). In one or more embodiments, the network provisioning server (101) includes various components described in reference to FIG. 1B below.

Although FIG. 1A only shows two client devices (e.g., client device X (102X), client device Y (102Y)), three network nodes (e.g., device X (106X), device Y (106Y), device Z (106Z)), and two network paths (e.g., network path XY (151), network path XZ (152)), those skilled in the art, having the benefit of this detailed description, will appreciate that the system (100) may have any number of client devices, network nodes, and network paths. Further, different network paths may share one or more devices or have different devices altogether.

Figure 1B:
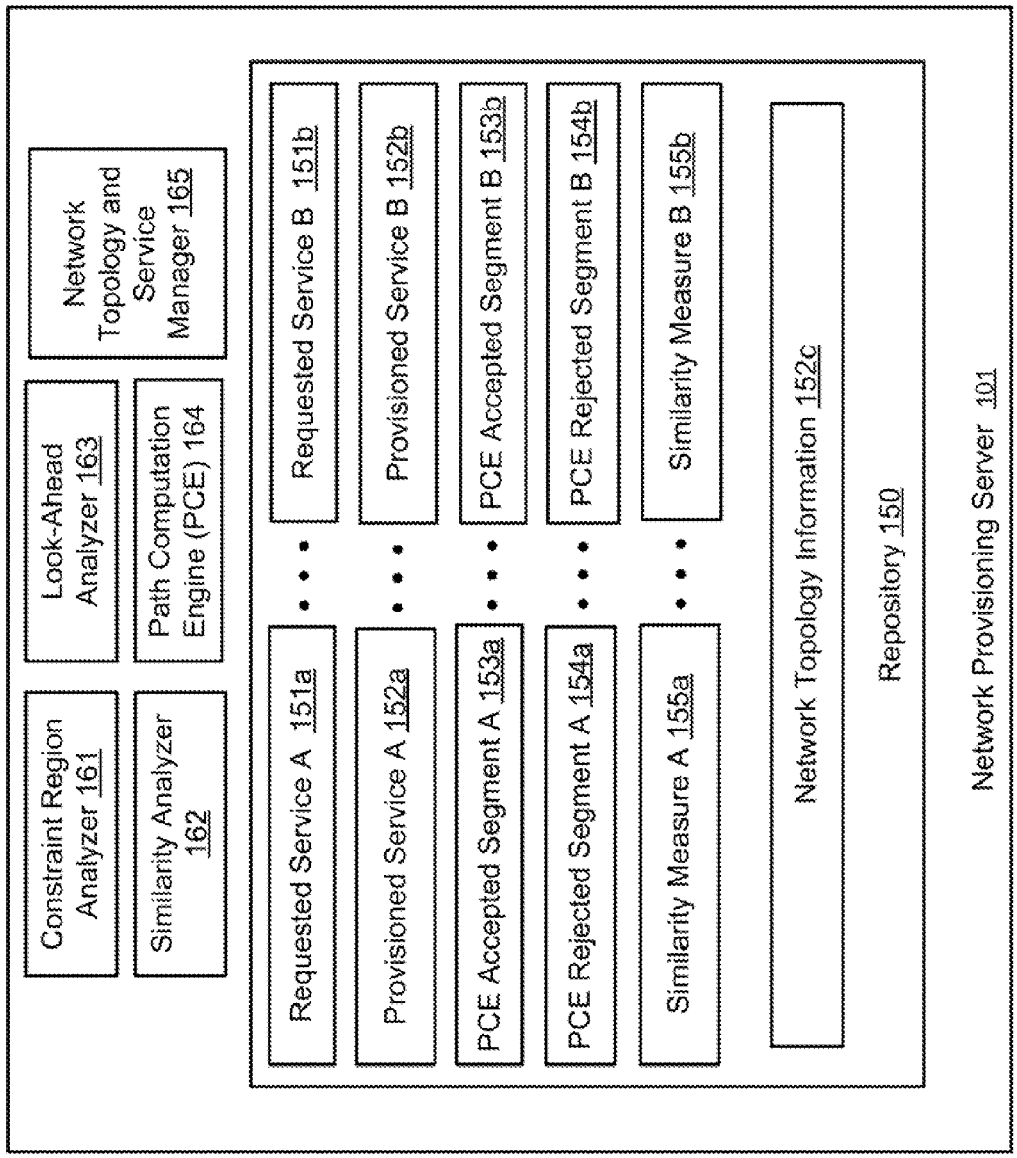

FIG. 1B shows details of the network provisioning server (101) depicted in FIG. 1A above. The modules and elements of both FIG. 1A and FIG. 1B are referenced in describing the network provisioning server (101) below. Specifically, the network provisioning server (101) includes a constraint region analyzer (161), a similarity analyzer (162), a look-ahead analyzer (163), a path computation engine (PCE) (164), a network topology and service manager (165), and a repository (150) that are coupled to each other. In one or more embodiments, one or more of the modules and elements shown in FIG. 1B may be omitted, repeated, and/or substituted. Accordingly, embodiments of the invention should not be considered limited to the specific arrangements of modules shown in FIG. 1B.

In one or more embodiments, the repository (150) may include a disk drive storage device, a semiconductor storage device, a database management system, other suitable computer data storage devices, or combinations thereof. In one or more embodiments, content stored in the repository (150) may be a data file, a linked list, a data sequence, a database, a graphical representation, or any other suitable data structure. In one or more embodiments of the invention, the repository (150) includes functionality to store data for the network provisioning server (101), such as the data generated and/or used by the constraint region analyzer (161), the similarity analyzer (162), the look-ahead analyzer (163), the path computation engine (PCE) (164), and the network topology and service manager (165). Each of these components includes a software component, a hardware component, or a combination thereof.

As shown in FIG. 1B, the data stored in the repository (150) includes requested services (e.g., requested service A (151a), requested service B (151b), etc.), provisioned services (e.g., provisioned service A (152a), provisioned service B (152b), etc.), PCE accepted segments (e.g., PCE accepted segment A (153a), PCE accepted segment B (153b), etc.), PCE rejected segments (e.g., PCE rejected segment A (154*a*), PCE rejected segment B (154*b*), etc.), similarity measures (e.g., similarity measure A (155*a*), similarity measure B (155*b*), etc.), and network topology information (152*c*).

A requested service is a network service that is currently being provisioned by the network provisioning server (101). For example, the requested service A (151*a*) may be currently provisioned in response to a request for a connection between the client device X (102X) and client device Y (102Y). In particular, the requested service A (151*a*) may include information regarding the requested bandwidth, service quality level, or other attribute of the connection. Similarly, the requested service B (151*b*) may be currently provisioned in response to another request for a separate connection between other client devices.

A provisioned service is a network service, whether currently active or terminated, that has been provisioned by the network provisioning server (101). For example, the provisioned service A (152*a*) may be provisioned in response to a request for a connection between the client device X (102X) and client device Z (106Z). In particular, the provisioned service A (152*a*) may include information regarding the links, nodes, and/or other devices, as well as the allocated bandwidth, service quality level, or other attribute of the provisioned network path XZ (152). Similarly, the provisioned service B (152*b*) may be provisioned in response to another request for a separate connection between other client devices.

A PCE accepted segment is a portion of a provisioned network path. For example, the PCE accepted segment A (153*a*) may include one or more links, one or more nodes, and/or one or more other devices (e.g., transform device, bridge device, etc., as defined below) included in the provisioned service A (152*a*). In another example, the PCE accepted segment B (153*b*) may include one or more links, one or more nodes, and/or one or more other devices (e.g., transform device, bridge device, etc., as defined below) included in the provisioned service B (152*b*).

A PCE rejected segment is a portion of a network path previously rejected during path computation of a provisioned service. For example, the PCE rejected segment A (154*a*) may include one or more links, one or more nodes, and/or one or more other devices previously rejected during path computation of the provisioned service A (152*a*). In another example, the PCE rejected segment B (154*b*) may include one or more links, one or more nodes, and/or one or more other devices (e.g., transform device, bridge device, etc. as defined below) previously rejected during path computation of the provisioned service B (152*b*).

A similarity measure is a measure of similarity between two network services, whether requested or provisioned. For example, the similarity measure A (155*a*) may represent a level of similarity between the requested service A (151*a*) and the provisioned service A (152*a*). In another example, the similarity measure B (155*b*) may represent a level of similarity between the requested service A (151*a*) and the requested service B (151*b*). In one or more embodiments, the similarity measure between two network services represents a number of source/destination parameters of the two network services that are the same or are within a predetermined difference range.

The network topology information (152*c*) includes information (referred to as topology attributes) regarding topological structure, whether physical or logical, of the network (120). In one or more embodiments, physical topology attributes include or otherwise describe device locations, transmission rates, signal types, physical interconnections, etc., in the network (120). In one or more embodiments, logical topology attributes include or otherwise describe how data flows within the network (120), regardless of the physical topology. For example, the logical topology attributes may include logical connectivity between devices. In one or more embodiments, the physical topology attributes and logical topology attributes are used to select network edge devices to provide a service, generate a network path between the selected network devices, and determine similarity between services, such as node similarity (e.g., a number of times a node is visited) and transformed similarity (e.g., a number of times that lambda is transformed) that are described below.

In one or more embodiments of the invention, the network provisioning server (101) includes the network topology and service manager (165) that is configured to enable a network service in response to a request from users of the network (120). For example, the request may correspond to the requested service A (151*a*) and identify the client device X (102X) and client device Y (102Y) to be connected through the network (120) for receiving the network service. Accordingly, the network topology and service manager (165) identifies, based on the network topology information (152*c*), the device X (106X) and device Y (106Y) as edge devices of the network (120) for providing a connection between the device X (106X) and client device Y (102Y). In one or more embodiments, the network topology and service manager (165) provides the network topology information (152*c*) to the PCE (164) to compute the network path XY (151) between the device X (106X) and device Y (106Y). In one or more embodiments, computing or otherwise generating the network path XY (151) includes device discovery, routing, and path computation to identify the links, intermediate nodes, and/or any intervening devices of the network path XY (151).

In one or more embodiments of the invention, the network provisioning server (101) includes the path computation engine (PCE) (164) that is configured to generate a network path (e.g., network path XY (151)) from a source device to a destination device according to a routing constraint of the network (120). Initially, the PCE (164) assigns one of the device X (106X) and device Y (106Y) as the source device (e.g., device X (106X)) and the other one as the destination device (e.g., device Y (106Y)) for computing the network path XY (151). In one or more embodiments, the network (120) is a multilayer network where each layer has specific routing constraints. The routing constraint is a restriction on using links to form a network path based on one or more parameters (e.g., layer-specific parameters) of the network (120). For example, the physical layer may have a physical layer routing constraint while the logical layer may have a logical layer routing constraint. Accordingly, the path computation in the multilayer network is constrained by a combination of the physical layer routing constraint and the logical layer routing constraint, referred to as a multilayer routing constraint. In other words, multiple layer-specific constraints in the multilayer network are collectively referred to as a multilayer constraint.

In one or more embodiments, the physical layer routing constraint is based on electrical signal frequency or optical signal wavelength accepted by the physical devices. As used herein, the term "accept" refers to being able to receive and/or transmit a signal on a frequency and/or a wavelength. In particular, two devices with different and non-overlapping accepted frequencies or wavelengths may not be connected as a valid link in the physical layer. In other words, a link connecting two devices with different accepted frequencies or wavelengths is an invalid link in the physical layer. In one or more embodiments, the logical layer routing constraint is based on VLAN (virtual local area network) ID (device identifier) allocation in assigning a portion of bandwidth to a network service. In particular, two devices with different VLAN ID allocation may not be connected as a valid link in the logical layer. In other words, a link connecting two devices with different VLAN ID allocation is an invalid link in the logical layer.

In one or more embodiments of the invention, the PCE (164) uses a BFS (Breadth First Search) algorithm to generate the network path (e.g., network path XY (151)) from the source device (e.g., device X (106X)) to the destination device (e.g., device Y (106Y)) according to a multilayer routing constraint of the network (120). Initially, the BFS begins from the source device and search all candidate devices associated with the source device to generate a valid link from the source device to a selected candidate device that satisfies the routing constraint. In particular, a candidate device associated with the device is a candidate to be evaluated by the BFS algorithm for including in the network path with the device. In one or more embodiments, the candidate devices are determined by the BFS algorithm according to a pre-determined rule. For example, the candidate device may be another device connected to the device without any intervening device. In other words, the candidate device associated with the device may be a neighbor of the device according to the pre-determined rule.

Further to generating the valid link from the source device to the selected candidate device (referred to as the valid link generation process), the BFS iterates the valid link generation process from the selected candidate device until the iteratively generated valid links form a network path to the destination device. As used herein, generating a valid link in each valid link generation process is referred to as a hop. In other words, the network path is formed from iteratively selected candidate devices through iteratively performed hops until the hop reaches the destination device. A hop may correspond to an external link or an internal link. An intermediate result (referred to as a candidate network path) of the path computation may include the iteratively selected candidate devices prior to reaching the destination device.

During the BFS, prior to finding the network path to the destination device, the PCE (164) rejects one or more candidate network paths that are deemed unreachable to the destination device or are deemed as violating the routing constraint. In response to each rejection decision by the PCE (164), the BFS may restart from the source device or an intervening device in the rejected candidate network path. In one or more embodiments, a path computation decision made by the PCE (164) during the BFS is stored in the repository (150) as a future reference to assist path computation for another network service connection. For example, one or more links, one or more nodes, and/or one or more other devices in one or more rejected candidate network paths are stored in the repository (150) as a PCE rejected segment (e.g., PCE rejected segment A (154a), PCE rejected segment B (154b), etc.). In another example, one or more links, one or more nodes, and/or one or more other devices accepted by the PCE (164) leading to the network path reaching the destination device are stored in the repository (150) as a PCE accepted segment (e.g., PCE accepted segment A (153a), PCE accepted segment B (153b), etc.).

In one or more embodiments of the invention, in each iteration of the BFS, the PCE (164) searches the aforementioned candidate devices according to a particular order based on a preference level assigned to each of the candidate devices. The preference level represents the level that the assigned candidate device is preferred to be searched prior to other candidate devices. The candidate device with a higher preference level is searched for generating the valid link prior to searching other candidate devices with a lower preference level. In one or more embodiments, the candidate devices with the preference level below a pre-determined threshold are excluded from the search.

In one or more embodiments of the invention, as an alternative to the BFS algorithm, the PCE (164) uses a search algorithm based on modified Dijkstra's shortest path and/or imperative and logic programming to generate the network path (e.g., network path XY (151)) from the source device (e.g., device X (106X)) to the destination device (e.g., device Y (106Y)). In one or more embodiments of the invention, the PCE (164) uses the method described in reference to FIG. 2 to perform the path computation described above.

In one or more embodiments of the invention, the network provisioning server (101) includes the look-ahead analyzer (163) that is configured to generate the preference level of a candidate device to represent a probability to include the candidate device in the network path. For a multiport device where each port may have different layer-specific parameters, the preference level may be specific to each port. In one or more embodiments, the look-ahead analyzer (163) generates the preference level in conjunction with the constraint region analyzer (161) and/or the similarity analyzer (162).

In one or more embodiments of the invention, the network provisioning server (101) includes the constraint region analyzer (161) that is configured to determine, based on a layer-specific parameter of the source device (e.g., device X (106X)) and the destination device (e.g., device Y (106Y)), a constraint region of the network path (e.g., network path XY (151)). The constraint region is a sub-network of the network (120) where any two devices in the sub-network may accept or forward signals or data packets with each other according to the routing constraint. For example, a physical layer constraint region may include devices reachable among each other based on the same physical layer-specific parameter (e.g., accepted frequency or wavelength). In another example, a logical layer constraint region may include devices reachable among each other based on the same logical layer-specific parameter (e.g., VLAN ID allocation). In one or more embodiments, the constraint region analyzer (161) determines the constraint regions using the method described in reference to FIG. 2 below.

Based on the results of the constraint region analyzer (161), the look-ahead analyzer (163) adjusts the preference level based on the constraint regions. In one or more embodiments, the look-ahead analyzer (163) adjusts the preference level using the method described in reference to FIG. 2 below.

In one or more embodiments of the invention, the network provisioning server (101) includes the similarity analyzer (162) that is configured to select a similar network service from previously provisioned services or from currently requested services. Two network paths are referred to as being similar to each other if the corresponding network services are determined to be similar by the similarity analyzer (162). In one or more embodiments, during the path computation of the network path XY (151) for the requested service A (151a), the similarity analyzer (162) may select the provisioned service A (152a) as being similar to the requested service A (151a) if the similarity measure A (155a) representing the two network services exceeds a pre-determined threshold. For example, the network path XZ (152) used to provide the provisioned service A (152a) may be referred to as the similar network with respect to the network path XY (151) during the path computation of the network path XY (151). In one or more embodiments, during the path computation of the network path XY (151) for the requested service A (151a), the similarity analyzer (162) may select the requested service B (151b) as being similar to the requested service A (151a) if the similarity measure B (155b) representing the two network services exceeds the pre-determined threshold. For example, a candidate network path (not shown) being concurrently computed to provide the requested service B (151b) may be referred to as the similar network with respect to the network path XY (151) during the path computation of the network path XY (151). In one or more embodiments, the similarity analyzer (162) selects the similar network path using the method described in reference to FIG. 2 below.

Based on the results of the similarity analyzer (162), the look-ahead analyzer (163) adjusts the preference level of one or more candidate devices based on one or more similar network services selected by the similarity analyzer (162). In one or more embodiments, the look-ahead analyzer (163) adjusts the preference level based on the similar network services using the method described in reference to FIG. 2 below. An example of generating and adjusting the preference levels to assist the path computation is described in reference to FIGS. 3A-3E below.

Figure 2:
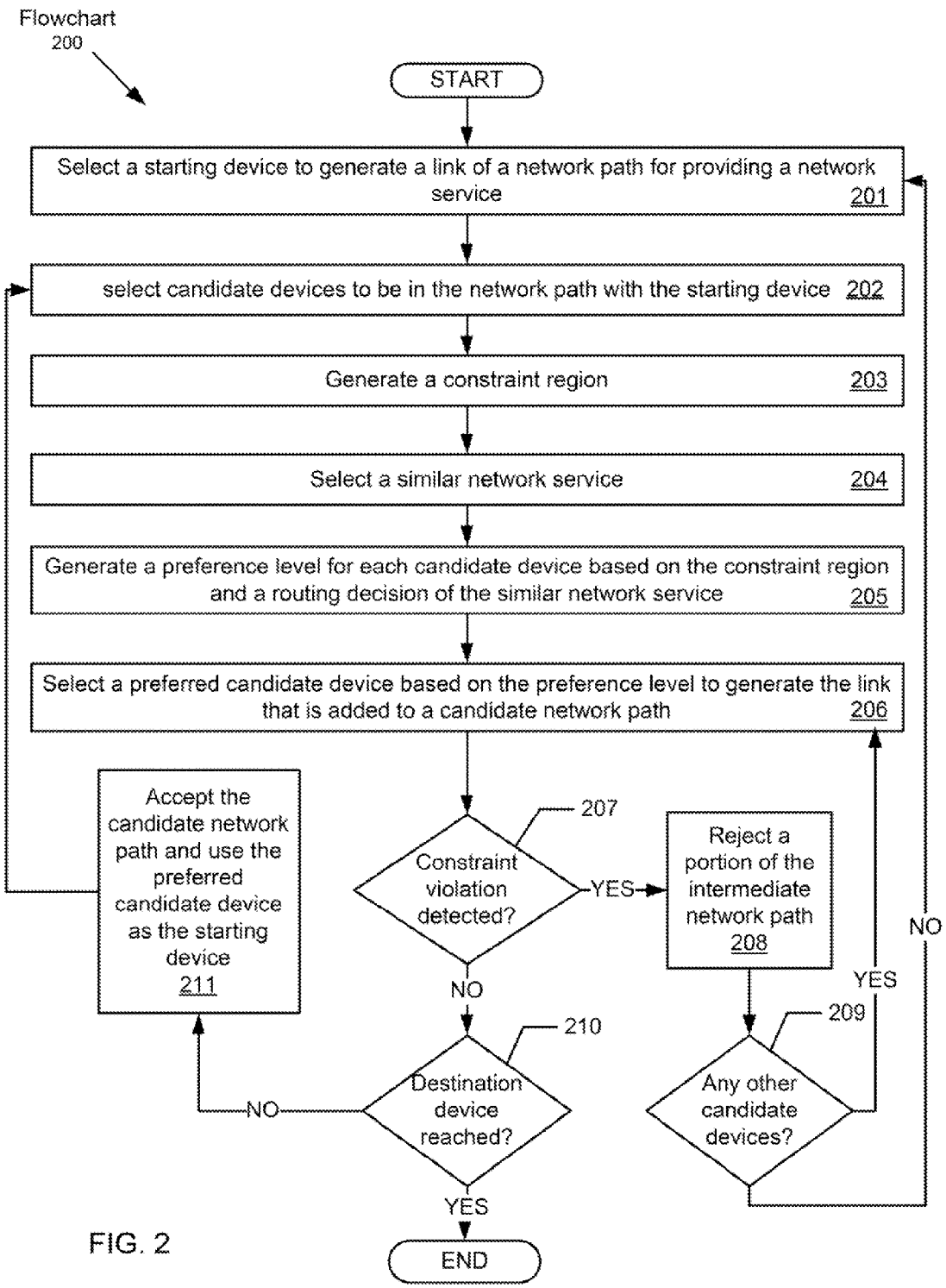
FIG. 2 shows a flowchart in accordance with one or more embodiments of the invention.

FIG. 2 shows a flowchart (200) in accordance with one or more embodiments. The process depicted in FIG. 2 may be used to generate a network path used to enable a network service of a network. The process shown in FIG. 2 may be executed, for example, by one or more components (e.g., network provisioning server (101), device X (106X), device Y (106Y), device Z (106Z), etc.) discussed above in reference to FIGS. 1A and 1B. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

As noted above, the network provisioning server (101) identifies similar network services provisioned before and make use of previously accepted and/or rejected paths and transforms as path computation references. The previously accepted and/or rejected paths and transforms are considered to have higher probability to be re-used during computing the network path for a new network service. Instead of doing exhaustive searching, the searching area is narrowed to improve the efficiency over time. In addition, unnecessary searching is reduced by exploring new untried paths and/or retrying rejected paths, periodically or triggered by an event, to find the feasible path sooner with reduced number of iterations. Accordingly, the possibility of false negative results is reduced.

Initially, in Step 201, a starting device is selected to generate a link of the network path for providing the network service. In one or more embodiments of the invention, the network service is requested to connect two client devices through the network. Based on the client devices and network topology information, two network edge devices are selected as a source device and a destination device to form the network path. In an initial iteration of the flowchart (200), the source device is selected as the starting device. In subsequent iterations of the flowchart (200), a candidate network path may be rejected and an intervening device in the candidate network path may be selected as the starting device. For example, a portion of the candidate network path from the source device to the intervening device is accepted while the remaining portion is rejected and excluded. Accordingly, the intervening device is selected as the starting device.

In Step 202, candidate devices are selected to be in the network path with the starting device. In other words, the candidate devices are additional candidates to form the network path with the starting device. In one or more embodiments, the candidate devices are selected based on topology information of the network. For example, the neighbors of the starting device may be selected as the candidate devices.

In Step 203, a constraint region is generated based on an attribute of one or more of the source device, the destination device, and a candidate device. In one or more embodiments, the attribute is a layer-specific parameter of the network. In one or more embodiments, a destination device physical layer constraint region is generated by identifying as many devices as possible that are reachable from the destination device based on a physical layer-specific parameter of the destination device. In one or more embodiments, a candidate device logical layer constraint region is generated by identifying as many devices as possible that are reachable from the candidate device based on the logical layer-specific parameter of the candidate device. For each network layer, multiple constraint regions may be determined corresponding to multiple candidate devices selected in Step 202.

In one or more embodiments, if the destination device and the candidate device have different physical layer-specific parameters, an overlap region of the destination device physical layer constraint region and the candidate device physical layer constraint region is searched to identify a device (referred to as a physical layer transform device) with the capability to transform between signals with the different physical layer-specific parameters. Similarly, a logical layer transform device may also be identified if the destination device and the candidate device have different logical layer-specific parameters.

In one or more embodiments, if no overlap exists between the destination device physical layer constraint region and the candidate device physical layer constraint region, a device (referred to as a physical layer bridge device) is identified in the network to act as a bridge between the two non-overlapping physical layer constraint region. In other words, the physical layer constraint region of the bridge device overlaps with both the destination device physical layer constraint region and the candidate device physical layer constraint region. Similarly, a logical layer bridge device may also be identified if no overlap exists between the destination device logical layer constraint region and the candidate device logical layer constraint region.

In Step 204, a similar network service is selected based on a similarity measure with respect to the requested network service for which the network path is being generated. In one or more embodiments, the similarity measure between two network services, whether provisioned or requested, is generated based on the multilayer topology attributes of the source device, destination device, and one or more intervening devices in two corresponding network paths, whether complete or partial. In one or more embodiments, the comparison is based on an exact match and the similarity measure corresponds to a number of matched multilayer topology attributes between the two network services. In one or more embodiments, the comparison is based on a pre-determined difference range and the similarity measure corresponds to a number of multilayer topology attributes that are within the pre-determined difference range between the two network services. In one or more embodiments, the comparison is based on an a combination of the exact match of certain multilayer topology attributes and the pre-determined difference range of other multilayer topology attributes. For example, the multilayer topology attributes may include the physical topology attributes and logical topology attributes. Specifically, the multilayer topology attributes of these devices are compared between the two network services to generate the similarity measure.

In one or more embodiments, the similarity measures with respect to the requested network service are generated for at least a portion of the provisioned services and other requested services in the network. Accordingly, one or more similarity network services are identified by comparing each of the corresponding similarity measures and a pre-determined threshold. Specifically, the similarity measure with respect to the requested network service of each identified similar network service exceeds the pre-determined threshold. The network path corresponding to the similar network service is referred to as the similar network path. PCE accepted segments and PCE rejected segments that are generated during the path computation of the similar network path are referred to as similar path computation acceptances and rejections. Preference levels generated during the path computation of the similar network path are referred to as similar preference levels.

In Step 205, a preference level for each candidate device is generated. In particular, the preference level represents a probability of including the candidate device in the network path with the starting device. In one or more embodiments, generating the preference level starting from setting an initial value that is adjusted based on the constraint regions and similar networks generated above.

In one or more embodiments, the preference level of a candidate device is increased if the destination device and the candidate device have the same layer-specific parameters, if a transform device is successfully identified, or if a bridge device is successfully identified. In one or more embodiments, the preference level is increased by a different amount for each of the three cases. The amount of increase may be configured based on a re-determined criterion for each of the three cases.

In one or more embodiments, the preference level of a candidate device is decreased if the destination device and the candidate device have different layer-specific parameters, if any transform device fails to be identified, or if any bridge device fails to be identified. In one or more embodiments, the preference level is decreased by a different amount for each of the three cases. The amount of decrease may be configured based on a re-determined criterion for each of the three cases.

In one or more embodiments, similar path computation acceptances and rejections are retrieved from records of the similar network paths. Accordingly, the preference level of the candidate device is further adjusted based on the retrieved similar path computation acceptances and rejections. For example, the preference level of a candidate device is increased if the candidate device is found in or is associated with a similar path computation acceptance. In another example, the preference level of a candidate device is decreased if the candidate device is found in or is associated with a similar path computation rejection. In one or more embodiments, the amount of adjustment is based on weights assigned to corresponding similar path computation acceptances and rejections.

In one or more embodiments, similar preference levels are retrieved from records of the similar network paths. Accordingly, the preference level of the candidate device is further adjusted based on the retrieved similar preference levels. In one or more embodiments, the amount of adjustment is based on weights assigned to corresponding similar preference levels.

In one or more embodiments, the preference levels generated in Step 205 are stored in the record of the network path being computed as a reference for other network path computations.

In Step 206, a preferred candidate device is selected to generate the link from the starting device where the link is added to the candidate network path. In other words, the candidate network path is extended by including the link. In one or more embodiments, the preferred candidate device is selected based on the preference level of the preferred candidate device. For example, the preferred candidate device has the highest preference level among all candidate devices selected in Step 202. Specifically, the preference levels are compared among all candidate devices to identify the preferred candidate device.

In one or more embodiments, a non-preferred candidate device is selected based on the preference level of the non-preferred candidate device. For example, the non-preferred candidate device has a preference level that is less than a pre-determined minimum threshold. In one or more embodiments, the non-preferred candidate device is excluded from being included in the network path. For example, the non-preferred candidate device may be annotated with an exclusion tag that is checked during subsequent path computation. In one or more embodiments, each non-preferred candidate device having a preference level less than the pre-determined minimum threshold is selected and excluded from the network path.

In Step 207, a determination is made as to whether the candidate network path violates the routing constraint. If the result is positive, i.e., the candidate network path violates at least one routing constraint, the method proceeds to Step 208. In contrast, if the result is negative, i.e., the candidate network path does not violate any routing constraint, the method proceeds to Step 210.

In Step 208, the preferred candidate device is rejected. In one or more embodiments, the rejected preferred candidate device is excluded from subsequent path computation. Accordingly, the method proceeds to Step 209 to adjust the candidate network path.

In Step 209, a determination is made as to whether any candidate device remains after rejecting the preferred candidate device in Step 208. If the result is positive, i.e., at least one candidate device remains, the method returns to Step 206 to select a different candidate device as the preferred candidate device to adjust the candidate network path. For example, one remaining candidate device that has the highest preference level of all remaining candidate devices may be selected as the new preferred candidate device. In contrast, if the result is negative, i.e., no more candidate device remains, the method returns to Step 201 to select a different starting device to restart the valid link generation process. For example, the candidate network path may be traced toward the source device to select an upstream device as the new starting device.

In Step 210, a determination is made as to whether the destination device is reached by the candidate network path. If the result is positive, i.e., the destination device has been reached, the method ends. Accordingly, the path computation terminates and the candidate network path reaching the destination device is used as the network path for enabling the network service. In contrast, if the result is negative, i.e., the destination device has not been reached, the method proceeds to Step 211.

In Step 211, the candidate network path is accepted as an intermediate result of the path computation. Accordingly, the preferred candidate device is used as the new starting device and the method returns to Step 202 to iterate the valid link generation process for the next hop in the network path.

In one or more embodiments, information regarding the preference level used in Step 206, the path computation rejection in Step 208, and the path computation acceptance in Step 211 are stored as a path computation reference for other path computations. For example, the path computation reference may include the PCE accepted segments and PCE rejected segments described in reference to FIG. 1B above.

In one or more embodiments, each stored path computation reference is assigned a weight. The weight may be periodically reduced in an aging process. The aging process effectively converts a stored path computation reference into a "soft" reference and encourages or otherwise biases the path computation to retry a rejected segment. For example, the weight may be reduced at a regular or random time interval, triggered by an event, or according to other scheduling method. The triggering event may include a change in the network topology, such as the addition/removal of a link or a node, network service, or any other event affecting bandwidth and/or other constraints. In one or more embodiments, if a "soft" reference results in another reject, the corresponding weight may be increased, e.g., reversed back to original value. This occasional shuffling of weight values reduces explicit bias to minimize false negatives.

FIGS. 3A, 3B, 3C, 3D, and 3E show an example in accordance with one or more embodiments of the invention. The multi-layer network (300) shown in FIGS. 3A-3E is an example of the network (120) discussed above in reference to FIG. 1A. In one or more embodiments, one or more of the modules and elements shown in FIGS. 3A-3E may be omitted, repeated, and/or substituted. Accordingly, embodiments of the invention should not be considered limited to the specific arrangements of modules shown in FIGS. 3A-3E.

As shown in FIG. 3A, the multi-layer network (300) includes a L0 layer (310) and a L2 layer (311). In one or more embodiments of the invention, the L0 layer (310) and the L2 layer (311) correspond to a physical layer and a network layer, respectively, of the network (120) shown in FIG. 1A. In particular, the L2 layer (311) is responsible for packet forwarding at a logical level, such as routing the logical data packets through intermediate network switches. For example, the L2 layer (311) may be the TCP/IP network layer. In contrast, the L0 layer (310) is responsible for unpackaged data bit transmission at a hardware level, such as transmitting electrical and/or optical signals over copper cables or optical fibers. For example, the L0 layer (310) may be the WDM (wavelength-division modulation) layer.

In one or more embodiments, the L0 layer (310) is the WDM layer and includes optical switches B, D, and F that forward optical signals of various wavelengths among multiple ports of each optical switch. In other words, each port of each optical switch is capable of passing through more than one wavelength of the optical signals. Each port is connected to an optical fiber implementing a link (referred to as an L0 layer link) of the WDM layer. For example, the optical switch B is shown as the device (315) having four ports connected to four links, such as the link A (316), link B (317), etc. In particular, the optical switch B (i.e., device (315)) is represented as a large circle B and the four links are represented as line/curve segments attached to the large circle B. Similarly, the optical switches D and F are represented as the large circles D and F, respectively. Throughout the discussion of FIGS. 3A-3E, for simplicity, the optical switches B, D, and F may be referred to as B, D, and F, respectively.

In one or more embodiments, the L2 layer (311) is the TCP/IP network layer and includes Ethernet devices A, C, E, G, and J represented as small circles. For example, the device J (313) is a Ethernet device having an L2 layer port J1 and an L0 layer port J2. Specifically, the L2 layer port is a logical interface of the Ethernet device and the L0 layer port is a physical interface of the Ethernet device. In particular, a physical interface may connect to a physical link (i.e., L0 layer link) in the L0 layer (310). Although not explicitly shown in FIG. 3A, a logical interface may connect to a logical link (referred to as an L2 layer link) in the L2 layer (311). In the device J (313), J2 and J1 are coupled via an adaptation (312). In one or more embodiments, an adaption coupling the L2 layer port and L0 layer port represents a bi-directional circuit and/or process that converts the data packets flowing through the L2 layer port to/from corresponding signals flowing through the L0 layer port. In this context, the term "adapting" refers to converting a signal with a particular wavelength into corresponding data packets having no reference to any wavelength, and vice versa. A signal may be adapted into corresponding data packets, and vice versa. In one or more embodiments, the L2 layer port, the L0 layer port, and the associated adaption are collectively referred to as a multi-layer port. For example, the device J (313) has a single multi-layer port. Throughout the discussion of FIGS. 3A-3E, for simplicity, the Ethernet devices A, C, E, G, and J may be referred to as A, C, E, G, and J, respectively and each port of the Ethernet device may be referred to as the concatenation of the label of the device and a number identifying the port. For example, G has two L2 layer ports (i.e., G1 and G3) and two corresponding L0 layer ports (i.e., G2 and G4).

In general, each Ethernet device shown in FIG. 3A has one or more multi-layer port(s). For example, each of C, E, and G has two multi-layer ports that are coupled to each other for passing the data packets in the L2 layer (311) within the Ethernet device. In contrast to the optical switches in L0 layer (310) where each port supports any wavelengths within a specified range, each L0 layer port of the Ethernet device may operate or support only a single wavelength. For example, each port of A, C, G, E operates at or supports a single wavelength only. In particular, each L0 layer port of A, C, G, E is labeled with the single supported wavelength. For example, C2 may pass any optical signal (referred to as $\lambda 1310$) having the wavelength of $1310\lambda$ while C4 may pass any optical signal (referred to as $\lambda 1550$) having the wavelength of $1550\lambda$. C may transform $\lambda 1550$ at C1 to $\lambda 1310$ at C2, and vice versa. In other words, C may perform the transformation between the $\lambda 1550$ at C1 and $\lambda 1310$ at C2. In one or more embodiments, the term "transformation" refers to the process of receiving a signal with a particular wavelength from a first L0 layer port of an Ethernet device, adapting the signal into data packets received by a corresponding first L2 layer port for passing to a second L2 layer port of the Ethernet device, and further adapting the data packets at the second L2 layer port into a different signal at a second L0 layer port of the Ethernet device with a different wavelength than what is supported by the first L0 layer port.

A multilayer constraint of a network path is a requirement that relates to one or more multi-layer ports in the network path. In one or more embodiments, the multilayer constraint of a network path between two Ethernet devices requires matching wavelengths of two L0 layer ports connecting any L0 layer link in the network path. In particular, an L0 layer link connecting two ports having different supported wavelengths is an invalid link for inclusion in the network path. Similarly, a network path including any L0 layer link connecting two ports having different supported wavelengths is an invalid network path. For example, to provision a network service using A and E (referred to as the network service A-E) as the source device and destination device, A1-A2-B-D-E4 is an invalid network path because A2 transmits λ1310 whereas E4 receives λ1550. The segment A2-B-D-E4 or A-B-D-E is stored as a PCE rejected segment for the network service A-E. In contrast, A1-A2-B-D-C2-C1-C3-C4-D-E4-E3 is a valid network path as C transforms λ1310 to λ1550. The segment A2-B-D-C2-C1-C3-C4-D-E4 or A-B-D-C-D-E is stored as a PCE accepted segment for the network service A-E. Each hop in the path computation is represented as an arrow in FIG. 3A.

In one or more embodiments, calculating or otherwise determining the valid network path A1-A2-B-D-C2-C1-C3-C4-D-E4-E3 includes performing the look-ahead steps of (1) determining that one or more transformation is needed based on different wavelengths of λ1310 and λ1550 of the source device A and destination device E, (2) determining that C is in the overlap region of the L0 layer constraint regions of A and E and is able to transform between λ1310 and λ1550. Therefore C is a preferred candidate for including in the network path, and (3) determining that G transforms between λ1310 and λ1400 while no other device transforms between λ1400 and λ1550. Therefore G is a non-preferred candidate for including in the network path. In one or more embodiments, a preference level is assigned to a device or a port to represent the probability for the device or port to be included in the network path. For example, the preference level of the preferred candidate C (or a port of C) is adjusted higher in response to the look-ahead step (2). Similarly, the preference level of the non-preferred candidate G (or a port of G) is adjusted lower in response to the look-ahead step (2).

FIG. 3B illustrates the generation of a network path using A and J as the source and destination devices to provide the network service A-J in the multilayer network (300). Even though A and J have the same supported wavelength 1310λ, A and J have non-overlapping constraint regions. In a look-ahead step, C and E are identified as bridge devices whose constraint regions overlap both the non-overlapping constraint regions of A and J. Accordingly, the preference level of C and E are adjusted higher to increase the probability that C and E are selected as preferred candidate devices during the path computation. During the path computation of the network service A-J, the following determinations are made:

(a) A1-A2-B-D-E4 is invalid as A2 transmits λ1310 whereas E4 receives λ1550.

(b) A1-A2-B-D-G2-G1-G3-G4-B-D-E4 is invalid as G converts λ1310 to λ1400 whereas E4 accepts λ1550.

(c) A transform from λ1310 to λ1550 to λ1310 is necessary.

(d) A1-A2-B-D-C2-C1-C3-C4-B-D-E4-E3-E1 is valid as C transforms λ1310 to λ1550 to be compatible with E.

(e) A transform from λ1310 to λ1550 may be obtained based on the path computation reference from the network service A-E or other similar network services previously or currently provisioned.

Each hop in the path computation is represented as an arrow in FIG. 3B.

In FIGS. 3A and 3B, a link in the network path is calculated or otherwise included in the network path iteratively, e.g., using an exhaustive search algorithm such as the aforementioned BFS. As noted above, determining or including an L0 layer link and/or an L2 layer link in the network path is referred to as a hop. In the exhaustive search algorithm, a particular link included in a previous hop may be removed from the network path in a subsequent iteration until the exhaustive search algorithm completes the network path that satisfies the multilayer constraint. In one or more embodiments, the look-ahead steps are performed using a hop-by-hop look-ahead approach as each link in the network path is determined iteratively. For example, the look-ahead step (1) may be performed when the hop A-B is determined, the look-ahead step (2) may be performed when the hop B-D is determined, and look-ahead step (3) may be performed when the hop D-C is determined.

In one or more embodiments, the preference level of a device or port is adjusted for each hop (i.e., each time a link in the network path is determined) iteratively. Accordingly, subsequent to the hop A-B and hop B-D, the preferred candidate C is used in the exhaustive search algorithm with a higher probability to be included in the resultant network path than the non-preferred candidate G. The hop-by-hop look-ahead approach prevents wasted computing time in calculating an invalid network path to destination, only to be rejected due to incompatible constraints.

Figure 3C:
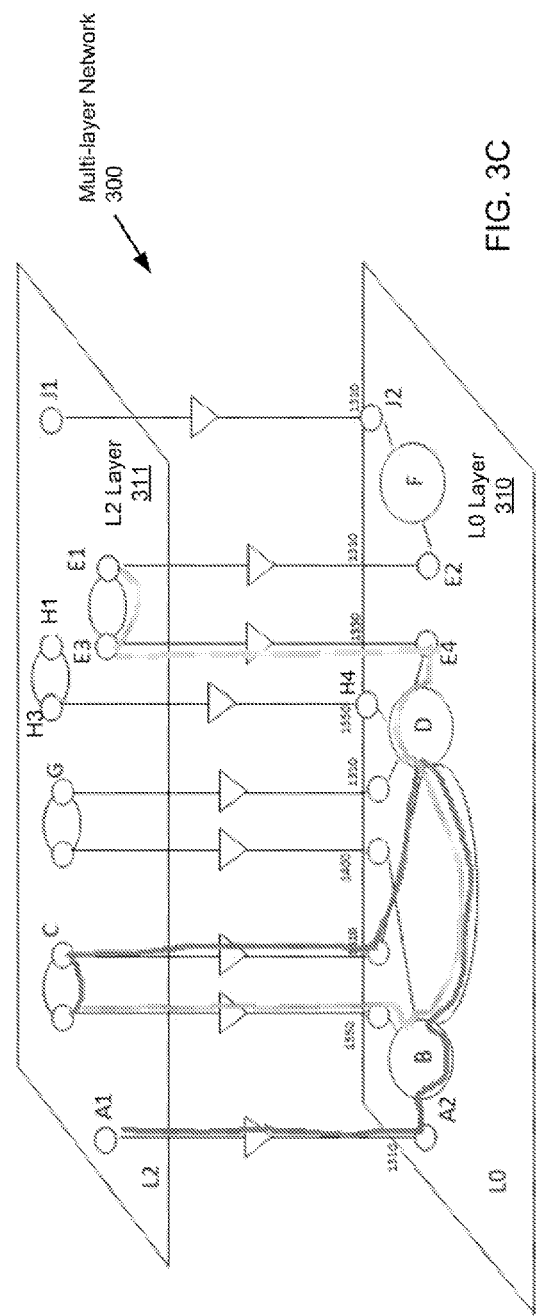
Figure 3D:
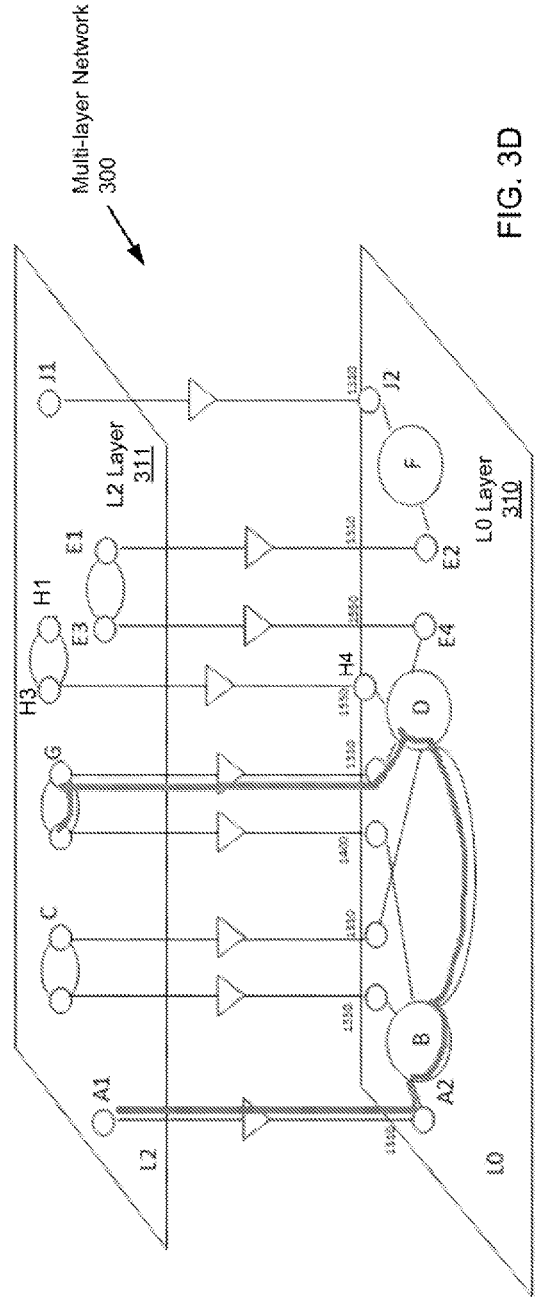
Figure 3E:
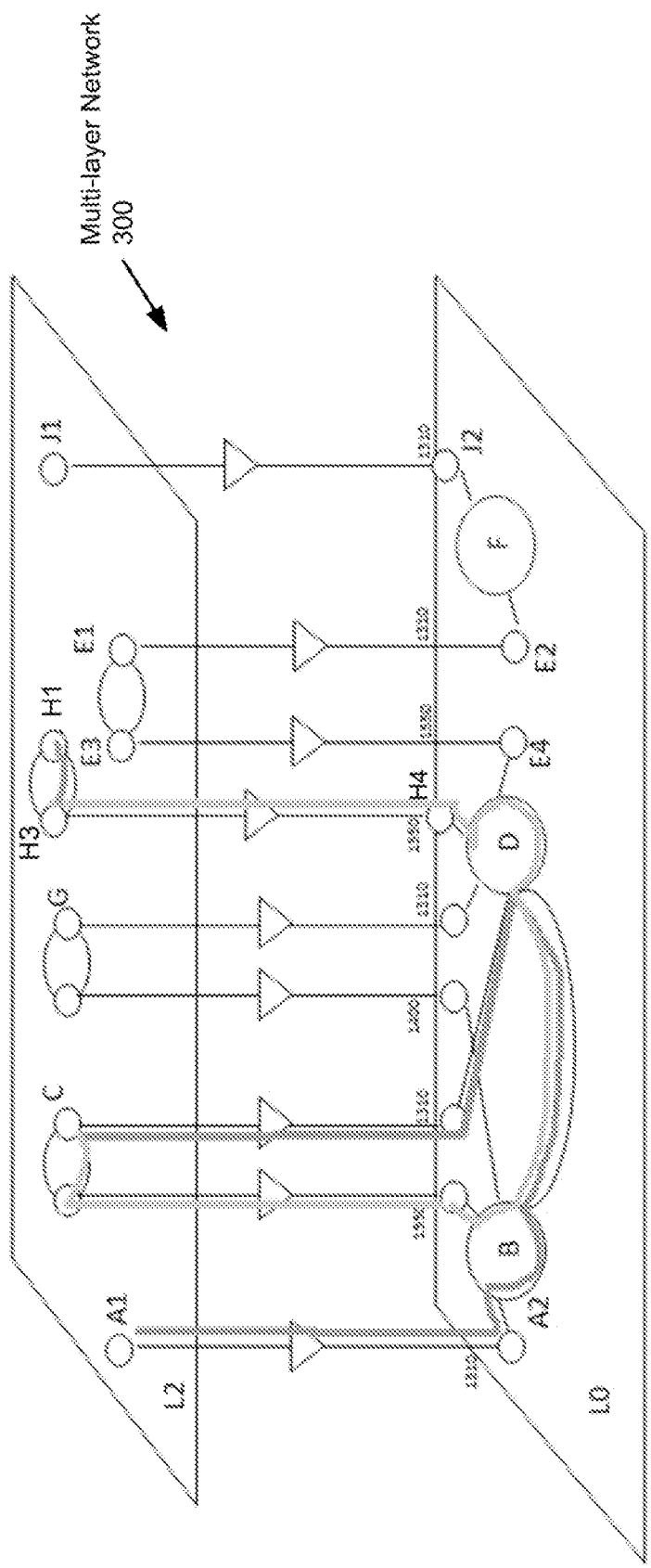

FIGS. 3C-3E show an example of generating and using similarity measures for path computation. The multilayer network (300) shown in FIGS. 3C-3E are substantially the same as shown in FIGS. 3A and 3B with the exception of an additional device H with a transform from λ1550 to λ1310. In addition, FIG. 3C shows a highlighted network path A-B-D-C-B-D-E for a provisioned network service S1 and FIG. 3D shows a highlighted network path A-B-D-G for a provisioned network service S2. Path computation references recorded during the path computations of S1 and S2 are used as references to generate the highlighted network path from A to H shown in FIG. 3E. The details of the network paths for S1 and S2 are shown below.

S1→A1-A2-B-D-C2-C1-C3-C4-B-D-E4-E3-E1

S2→A1-A2-B-D-G2-G1-G3

In order to provision another network service S3 between devices A and H, the look-ahead analyzer (LAM) determines that a transform is necessary because A2 transmits λ1310 whereas H4 receives λ1550. Similarity measure calculation below shows that S3 is more similar to S1 than S2 (which does not need a transform) and hence suggests to the path computation engine (PCE) that the loop B-D-C2-C1-C3-C4-B-D in the network path for S1 may be used for S3 as well.

In one or more embodiments, a node similarity and a transform similarity are calculated to generate the similarity measure between S1 and S3. In one or more embodiments, a node perspective feature vector is constructed for each network service where each value in the vector represents the count of occurrence of a node in the corresponding network service. There are 9 nodes used for S1 and S2, namely A, B, C, D, E, F, G, H, J. Accordingly, a 9 element node perspective feature vector is constructed for each of S1 and S2 where each value in the node perspective feature vector represents a number of times the network service (by way of the corresponding network path) visits this node and is ordered [A, B, C, D, E, F, G, H, J]. S1 visits A→B→D→C→B→D→E and is represented by the node perspective feature vector $\vec{v1}$=[1,2,1,2,1,0,0,0,0]. In particular, S1 visits each of B and D twice and the corresponding vector element value is set to 2. S2 visits A→B→D→G and is represented by the node perspective feature vector $\vec{v2}$=[1,1,0,1,0,0,1,0,0]. S3, with the source and destinations A and H, is initially represented by the node perspective feature vector $\vec{v3}$=[1,0,0,0,0,0,0,0,1]. In one or more embodiments, the node similarity is calculated using the formula below:

$$Sim(i, j) = \cos(\vec{i}, \vec{j}) = \frac{\vec{i} \cdot \vec{j}}{|\vec{i}| * |\vec{j}|}$$

Accordingly, the node similarity between S1 and S3 is calculated as below:

$$NodeSim(S1, S3) = \frac{\vec{v1} \cdot \vec{v3}}{|\vec{v1}| * |\vec{v3}|} =$$

$$\frac{[1,2,1,2,1,0,0,0,0] \cdot [1,0,0,0,0,0,0,0,1]}{|[1,2,1,2,1,0,0,0,0]| * |[1,0,0,0,0,0,0,0,1]|} = \frac{1}{\sqrt{22}} = 0.213$$

Similarly, the node similarity between S2 and S3 is calculated as below:

$$NodeSim(S2, S3) = \frac{\vec{v2} \cdot \vec{v3}}{|\vec{v2}| * |\vec{v3}|} =$$

$$\frac{[1,1,0,1,0,0,1,0,0] \cdot [1,0,0,0,0,0,0,0,1]}{|[1,1,0,1,0,0,1,0,0]| * |[1,0,0,0,0,0,0,0,1]|} = \frac{1}{\sqrt{8}} = 0.353$$

In one or more embodiments, the transform similarity is based on a number of wavelengths that are involved in the network path and a number of times transform occurs in the network path, as well as whether the source device wavelength and destination device wavelength match between the two network services. If the source device wavelength between the two network services match, a factor of 1.0 is applied. If they do not match, the factor of 0.5 is applied. The same procedure is used for the destination device wavelength. For example, if both the source device wavelengths and the destination device wavelengths of the two network services match, the factor 1.0 is applied. In particular, this matching condition is considered advantageous for the two network services to visit the same nodes to transform wavelengths. If either the source device wavelengths or the destination device wavelengths of the two network services fail to match, the factor 0.5 is applied. If both the source device wavelengths and the destination device wavelengths of the two network services fail to match, the factor 0.5*0.5=0.25 is applied. For S1 and S2, three wavelengths (i.e., λ1310, λ1400, λ1550) are used. Accordingly, the transform perspective feature vector is constructed by counting how many times each wavelength is used for the network service and ordering the vector elements according to the sequence [λ1310, λ1400, λ1550].

As noted above, S1 transforms between λ1310 and λ1550 which starts from λ1310 and ends in λ1550 with the transform perspective feature vector $\vec{t1}$=[1,0,1]. S2 does not transform between wavelengths and uses λ1310 only. The transform perspective feature vector of S2 is $\vec{t2}$=[1,0,0]. S3 has a source wavelength of λ1310 and destination wavelength of λ1550 with the transform perspective feature vector $\vec{t3}$=[1,0,1], which involves transforming wavelength at least one time, possibly traversing the same path as S1 to reach the transform device. Because S2 starts and ends with λ1310, which have the same start wavelength but different destination wavelength compared to S3, the factor 0.5 is applied for calculating the transform similarity. Because S1 has the same source and destination wavelengths as S3, the factor 1.0 is applied for calculating the transform similarity.

Accordingly, the transform similarity between S1 and S3 is calculated as below:

$$TransformSim(S1, S3) =$$

$$\frac{\vec{t1} \cdot \vec{t3}}{|\vec{t1}| * |\vec{t3}|} * factor = \frac{[1,0,1] \cdot [1,0,1]}{|[1,0,1]| * |[1,0,1]|} = \frac{2}{2} * 1.0 = 1.0$$

Similarly, the transform similarity between S2 and S3 is calculated as below:

$$TransformSim(S2, S3) =$$

$$\frac{\vec{t2} \cdot \vec{t3}}{|\vec{t2}| * |\vec{t3}|} * factor = \frac{[1,0,0] \cdot [1,0,1]}{|[1,0,0]| * |[1,0,1]|} = \frac{1}{\sqrt{2}} * 0.5 = 0.354$$

Using equal initial weights assigned to the node similarity and transform similarity, the two similarities are aggregated to generate the similarity measure:

Accordingly, the similarity measure between S1 and S3 is calculated as below:

Sim(S1,S3)=0.5*0.213+0.5*1.0=0.6065

Similarly, the similarity measure between S2 and S3 is calculated as below:

Sim(S2,S3)=0.5*0.353+0.5*0.354=0.3535

Since Sim(S1,S3)>Sim(S2, S3), S1 is selected as the similar network service for S3. The LAM determines that the similar network service S3 uses a transform device from λ1310 to λ1550 and suggests PCE to search for the same or similar transform device, such as C. This suggestion optimizes the PCE behavior by restricting the traversal to devices with less potential such as G or E. As a result, the network path for S3 is calculated as shown below and is shown in FIG. 3C as the highlighted network path.

S3→A1-A2-B-D-C2-C1-C3-C4-B-D-H4-H3-H1

Various embodiments may have one or more of the following advantages in improving path computation efficiency: excluding network path candidates that have historically proven futile; including network path candidates that were acceptable to "similar" network paths for provisioned services; and changing the weights of previous accepts and rejects in a periodic or event-triggered basis into "hard references" or "soft references" to influence path computation to overcome past biases and try out new paths, or re-try rejected paths to reduce false negatives.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory, and input and output device(s) to perform one or more embodiments of the invention.

Figure 4:
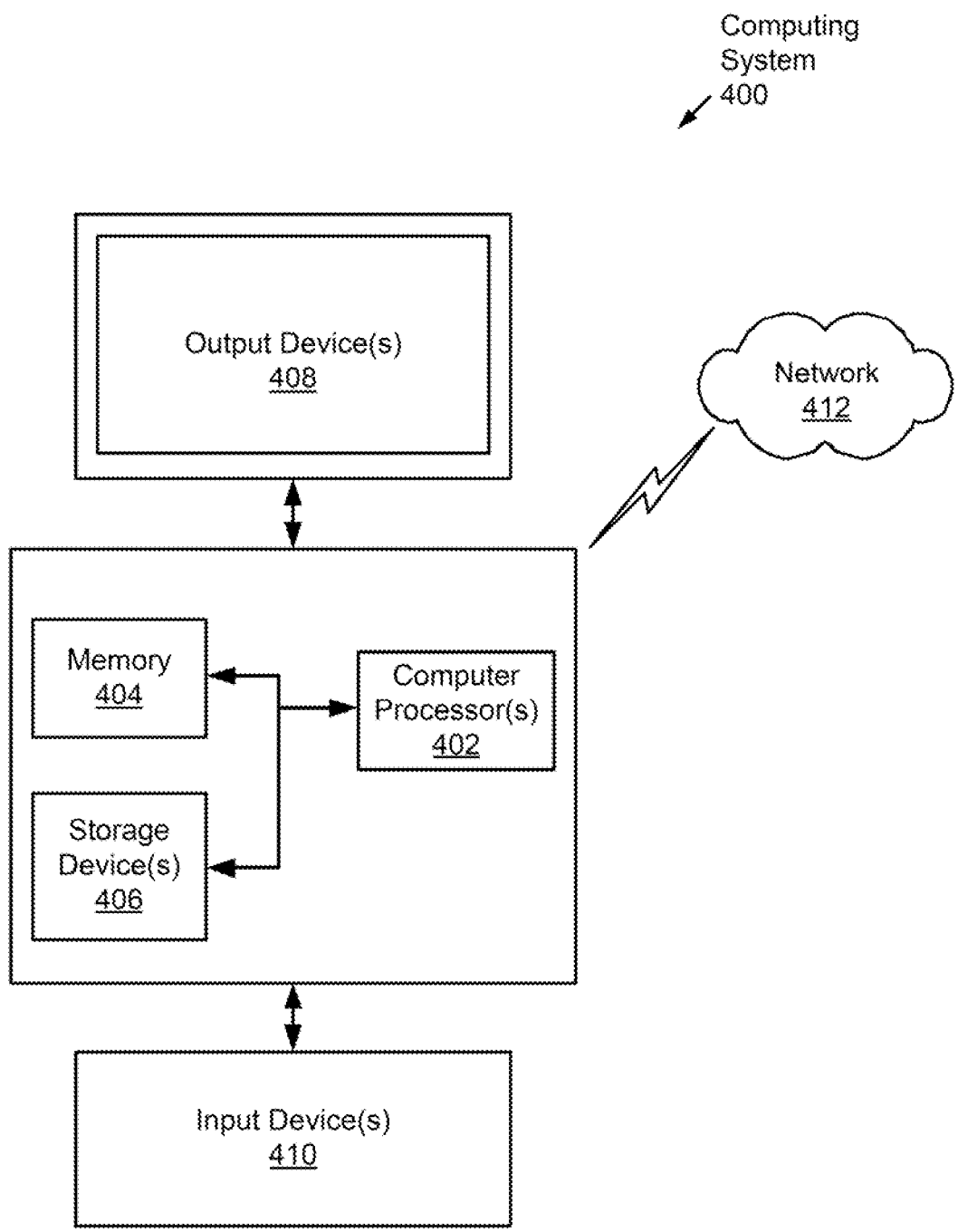
FIG. 4 shows a computing system in accordance with one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores, of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other non-transitory computer readable storage medium. Specifically, the software instructions may correspond to computer readable program code that, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for operating a network, comprising:
a processor; and
memory comprising instructions for generating a network path from a source device to a destination device, wherein the instructions, when executed, cause the processor to:
select, from the network comprising a first optical network layer and a second network layer that operates over the first optical network layer, a first intervening device that is a node in the network for connecting the source device and the destination device to form the network path;
further select, from the network and as additional candidates to form the network path, a first plurality of candidate devices, each being a node in the network that could form the network path, to be in the network path with the first intervening device; and
generate, according to a multilayer constraint of the first optical network layer and the second network layer, the network path based on the first intervening device and a preference level of each of the first plurality of candidate devices, wherein the multilayer constraint corresponds to a difference in wavelengths operating on the first optical network layer by physical devices in the second network layer such that different supported wavelengths are invalid for the multilayer constraint;
generate the preference level of each corresponding candidate device of the first plurality of candidate devices, the preference level representing a probability of including a candidate device in the network path;
select, from the first plurality of candidate devices, a non-preferred candidate device based on the preference level of the non-preferred candidate device; and
exclude the non-preferred candidate device from being included in the network path, wherein, to generate the network path, the instructions, when executed, cause the processor to
generate, in a first iteration, a candidate network path based on the first intervening device and the preference level of each of the first plurality of candidate devices;
determine that the candidate network path violates the multilayer constraint, wherein at least a portion of the candidate network path is excluded from being included in the network path;
select, from the network, a second intervening device that is another node in the network for connecting the source device and the destination device to form the network path;
further select, from the network and as further additional candidates to form the network path, a second plurality of candidate devices, each being a node in the network that could form the network path, to be in the network path with the second intervening device; and
further generate, according to the multilayer constraint of the network and in a second iteration, the network path based on the second intervening device and the preference level of each of the second plurality of candidate devices.

2. The system of claim 1, wherein the instructions, when executed, further cause the processor to:
select, from the first plurality of candidate devices, a preferred candidate device based on the preference level of the preferred candidate device,
wherein the network path is further generated based on the preferred candidate device.

3. The system of claim 1, wherein the instructions, when executed, further cause the processor to:
determine, based on an attribute of the source device and the destination device, a constraint region of the network path, and
adjust the preference level based on the constraint region.

4. The system of claim 1, wherein the instructions, when executed, further cause the processor to:
generate a plurality of network paths separate from the network path;
select, from the plurality of network paths, a similar network path based on a similarity measure with respect to the network path;
retrieve a plurality of preference levels that was generated during generation of the similar network; and
adjust the preference level of the candidate device based on the plurality of preference levels.

5. The system of claim 1, wherein the instructions, when executed, further cause the processor to:
provide topology information of the network, wherein the first intervening device and the first plurality of candidate devices are selected based on the topology information; and
enable a network service via the source device and the destination device using the network path.

6. A method for operating a network, comprising:
selecting, from the network comprising a first optical network layer and a second network layer that operates over the first optical network layer, a first intervening device that is a node in the network for connecting a source device and a destination device to form a network path;
further selecting, from the network and as additional candidates to form the network path, a first plurality of candidate devices, each being a node in the network that could form the network path, to be in the network path with the first intervening device;
generating a preference level for each candidate device of the first plurality of candidate devices, the preference level representing a probability of including a candidate device in the network path;
according to a multilayer constraint of the first optical network layer and the second optical network layer, the network path based on the first intervening device and the preference level of each of the first plurality of candidate devices,
wherein the multilayer constraint corresponds to a difference in wavelengths operating on the first optical network layer by physical devices in the second network layer such that different supported wavelengths are invalid for the multilayer constraint;
selecting, from the first plurality of candidate devices, a non-preferred candidate device based on the preference level of the non-preferred candidate device; and
excluding the non-preferred candidate device from being included in the network path, wherein generating the network path includes
generating, in a first iteration, a candidate network path based on the first intervening device and the preference level of each of the first plurality of candidate devices;
determining that the candidate network path violates the multilayer constraint, wherein at least a portion of the candidate network path is excluded from being included in the network path;
selecting, from the network, a second intervening device that is another node in the network for connecting the source device and the destination device to form the network path;
further selecting, from the network and as further additional candidates to form the network path, a second plurality of candidate devices, each being a node in the network that could form the network path, to be in the network path with the second intervening device; and
further generating, according to the multilayer constraint of the network and in a second iteration, the network path based on the second intervening device and the preference level of each of the second plurality of candidate devices.

7. The method of claim 6, further comprising:
selecting, from the first plurality of candidate devices, a preferred candidate device based on the preference level of the preferred candidate device,
wherein the network path is further generated based on the preferred candidate device.

8. The method of claim 6, further comprising:
determining, based on an attribute of the source device and the destination device, a constraint region of the network path,
adjusting the preference level based on the constraint region.

9. The method of claim 6, further comprising:
generating a plurality of network paths separate from the network path, selecting, from the plurality of network paths, a similar network path based on a similarity measure with respect to the network path,
retrieving a plurality of preference levels that was generated during generation of the similar network; and
adjusting the preference level of the candidate device based on the plurality of preference levels.

10. The method of claim 6, further comprising:
providing topology information of the network, wherein the first intervening device and the first plurality of candidate devices are selected based on the topology information; and
enabling a network service via the source device and the destination device using the network path.

11. A non-transitory computer readable medium (CRM) storing instructions for operating a network, the instructions, when executed by a computer processor, comprising functionality for:
selecting, from the network comprising a first optical network layer and a second network layer that operates over the first optical network layer, a first intervening device that is a node in the network for connecting a source device and a destination device to form a network path;
further selecting, from the network and as additional candidates to form the network path, a first plurality of candidate devices, each being a node in the network that could form the network path, to be in the network path with the first intervening device;
generating a preference level for each candidate device of the first plurality of candidate devices, the preference level representing a probability of including a candidate device in the network path;
generating, according to a multilayer constraint of the first optical network layer and the second network layer, the network path based on the first intervening device and the preference level of each of the first plurality of candidate devices,
wherein the multilayer constraint corresponds to a difference in wavelengths operating on the first optical network layer by physical devices in the second network layer such that different supported wavelengths are invalid for the multilayer constraint;
selecting, from the first plurality of candidate devices, a non-preferred candidate device based on the preference level of the non-preferred candidate device; and
excluding the non-preferred candidate device from being included in the network path, wherein generating the network path includes
generating, in a first iteration, a candidate network path based on the first intervening device and the preference level of each of the first plurality of candidate devices;
determining that the candidate network path violates the multilayer constraint, wherein at least a portion of the candidate network path is excluded from being included in the network path;

selecting, from the network, a second intervening device that is another node in the network for connecting the source device and the destination device to form the network path;

further selecting, from the network and as further additional candidates to form the network path, a second plurality of candidate devices, each being a node in the network that could form the network path, to be in the network path with the second intervening device; and further generating, according to the multilayer constraint of the network and in a second iteration, the network path based on the second intervening device and the preference level of each of the second plurality of candidate devices.

12. The CRM of claim 11, the instructions, when executed by the computer processor, further comprising functionality for:

selecting, from the first plurality of candidate devices, a preferred candidate device based on the preference level of the preferred candidate device, wherein the network path is further generated based on the preferred candidate device.

13. The CRM of claim 11, the instructions, when executed by the computer processor, further comprising functionality for:

determining, based on an attribute of the source device and the destination device, a constraint region of the network path, adjusting the preference level based on the constraint region.

14. The CRM of claim 11, the instructions, when executed by the computer processor, further comprising functionality for:

generating a plurality of network paths separate from the network path, selecting, from the plurality of network paths, a similar network path based on a similarity measure with respect to the network path, retrieving a plurality of preference levels that was generated during generation of the similar network; and adjusting the preference level of the candidate device based on the plurality of preference levels.

* * * * *